(12) United States Patent
Zhu et al.

(10) Patent No.: US 9,556,851 B2
(45) Date of Patent: Jan. 31, 2017

(54) SYSTEM FOR REDUCING VIBRATION IN A WIND TURBINE

(71) Applicant: General Electric Company, Schenectady, NY (US)

(72) Inventors: Farong Zhu, Greenville, SC (US); Munishwar Ahuja, Bangalore (IN); Biao Fang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 969 days.

(21) Appl. No.: 13/855,917

(22) Filed: Apr. 3, 2013

(65) Prior Publication Data

US 2014/0301846 A1    Oct. 9, 2014

(51) Int. Cl.
*F03D 7/02*    (2006.01)
*F16F 7/116*    (2006.01)

(52) U.S. Cl.
CPC ............. *F03D 7/0296* (2013.01); *F03D 80/00* (2016.05); *F03D 80/88* (2016.05); *F16F 7/116* (2013.01); *F05B 2260/964* (2013.01); *Y02E 10/722* (2013.01); *Y02E 10/723* (2013.01)

(58) Field of Classification Search
USPC ................................ 416/244 R, 144; 188/380
See application file for complete search history.

(56) References Cited

U.S. PATENT DOCUMENTS

| | | | |
|---|---|---|---|
| 4,641,732 A | 2/1987 | Andry | |
| 6,354,211 B1 | 3/2002 | Douillard et al. | |
| 6,672,837 B1 | 1/2004 | Veldkamp et al. | |
| 7,220,104 B2 | 5/2007 | Zheng et al. | |
| 7,309,930 B2 | 12/2007 | Suryanarayanan et al. | |
| 7,692,322 B2 | 4/2010 | Wakasa et al. | |
| 8,026,623 B2 | 9/2011 | Wakasa et al. | |
| 8,115,331 B2 | 2/2012 | Wakasa et al. | |
| 8,143,739 B2 | 3/2012 | Sloth | |
| 8,299,643 B2 | 10/2012 | Wakasa et al. | |
| 8,302,748 B2 | 11/2012 | Retat et al. | |

(Continued)

FOREIGN PATENT DOCUMENTS

DE    EP 1008747 B1 *    6/2008    ............. F03D 11/00
DE    102012222191.3 A1 *    12/2012

(Continued)

OTHER PUBLICATIONS

English Translation of EP 1008747 B1.*

(Continued)

*Primary Examiner* — Kenneth Bomberg
*Assistant Examiner* — Paul Thiede
(74) *Attorney, Agent, or Firm* — Dority & Manning, P.A.

(57) ABSTRACT

A system for reducing vibration in a wind turbine includes a mass structure having at least one hole extending therethrough; a rod having a top threaded portion, an upper level stop disposed on or below the threaded portion, and a fixed lower level stop disposed below the upper level stop. The mass structure has a designed weight and shape that, in combination with the adjustable axial distance between the upper level stop and the lower level stop, is designed to provide a properly tuned system for a particular frequency. A base having an aperture designed for receipt of the lower level stop therein is configured for attachment to a component of the wind turbine.

18 Claims, 6 Drawing Sheets

(56) References Cited

U.S. PATENT DOCUMENTS

| | | | |
|---|---|---|---|
| 8,336,687 B2 | 12/2012 | Kawabata et al. | |
| 8,395,273 B2 | 3/2013 | Wakasa et al. | |
| 2005/0230979 A1* | 10/2005 | Bywaters | F03D 7/0248 290/44 |
| 2015/0322923 A1* | 11/2015 | Konitz | F16F 7/116 416/144 |

FOREIGN PATENT DOCUMENTS

| EP | 2 067 991 A2 | 6/2009 |
|---|---|---|
| EP | 2 644 886 A2 | 10/2013 |

OTHER PUBLICATIONS

International Search Report and Written Opinion issued in connection with corresponding PCT Application No. PCT/US2014/031857 dated Jun. 24, 2014.

* cited by examiner

SYSTEM FOR REDUCING VIBRATION IN A WIND TURBINE

FIELD OF THE INVENTION

The present invention relates generally to wind turbines, and more particularly, to a system for reducing vibration in a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub and one or more rotor blades. The nacelle typically consists of a bedplate and a cover. The bedplate supports the generator, gearbox and other components located in the nacelle and transfers loads from the rotor to the tower. The rotor blades capture kinetic energy of wind using known airfoil principles. The rotor blades transmit the kinetic energy in the form of rotational energy so as to turn a shaft coupling the rotor blades to a gearbox, which is connected to the nacelle by a torque arm. The rotational energy is then transferred to the generator through the gearbox. The generator then converts the mechanical energy to electrical energy that may be deployed to a utility grid.

Excessive noise generated by wind turbines is an ongoing concern, particularly in residential neighborhoods and areas surrounding a wind farm. A substantial contributor to wind turbine noise is vibrations induced in various components of the drive train and support structure. For example, in some instances, the gearbox creates strong vibrations that are subsequently transmitted to other components of the wind turbine, which may induce substantial noise. Thus, in many cases, a system commonly referred to as a tuned mass absorber (TMA) or tuned mass damper (TMD) is installed to reduce gearbox vibration.

Generally, TMAs are energy absorbing devices having a mass and one or more supporting rods mounted on a base structure. A TMA is typically mounted to a component of the wind turbine having a strong vibration under a certain frequency, such that energy is transferred from the component to the TMA. The highest energy transfer occurs when the natural frequency of the TMA is tuned to the natural frequency of the component. As such, typical TMAs operate efficiently only in a narrow band of frequencies, therefore, proper initial tuning and tuning maintenance are important design considerations for ensuring a properly working TMA.

Additionally, and as mentioned, TMAs are commonly installed on the torque arm of a gearbox of a wind turbine to reduce gearbox vibration. Although gearbox vibration at a particular frequency is a contributor to the noise issue, gearbox vibration is not a particularly "strong" contributor. On the other hand, bedplate vibration at generally the same frequency may excite structural components that are major radiators of overall noise, such as the tower or nacelle. Bedplate vibration typically results from the gearbox inducing such vibrations at a resonant or harmonic frequency. As such, bedplate vibration introduces component noise radiation and may cause more disturbing noise to neighboring areas in comparison to gearbox vibration.

Accordingly, an improved system for reducing vibrations in a wind turbine would be desired in the art. For example, a system for reducing vibrations in a wind turbine, wherein the system is located on the bedplate instead of the torque arm of the gearbox would be advantageous.

BRIEF DESCRIPTION OF THE INVENTION

Aspects and advantages of the invention are set forth below in the following description, or may be obvious from the description, or may be learned through practice of the invention.

In one embodiment, a system for reducing vibration in a wind turbine is disclosed. The system may include a mass structure having at least one hole extending therethrough, for example from a top mass surface to a bottom mass surface; a rod having a top threaded portion, an upper level stop disposed on or below the threaded portion, and a fixed lower level stop disposed below the upper level stop; the top threaded portion extending through the hole in the mass structure, with the mass structure resting on the upper level stop; and a base, the base having an aperture designed for receipt of the lower level stop therein, the base configured for attachment to a component of the wind turbine. Further, the mass structure may have a designed weight and shape that, in combination with a fixed axial distance between the upper level stop and the lower level stop, may be designed to give the system a specifically tuned natural frequency. In yet another embodiment, the system may include a wire mesh between the upper level stop and the lower level stop so as to provide damping to the system.

In further embodiments, the system may also include a plurality of rods symmetrically disposed relative to the mass structure and the base. For example, in one embodiment, the mass structure may have a generally square shape, including four rods symmetrically spaced relative to the mass structure. Further, the upper level stop may include a sleeve nut disposed on and axially locked on the threaded portion of the rod so as not to move axially on the threaded portion of the rod after the sleeve nut is properly positioned for concerned frequency. Moreover, the sleeve nut may include an upper portion and a lower portion, wherein the upper portion has a flat top surface and a first diameter, wherein the lower portion has a second diameter, and wherein the first diameter is greater than the second diameter.

In still another embodiment, the lower level stop may have a tapered conical configuration. Further, the aperture in the base may have a corresponding conical recess for receipt of the conical-shaped lower level stop such that a top surface of the lower level stop is flush with a top surface of the base. In various embodiments, the base may be configured for attachment to a bedplate of a wind turbine.

Still further aspects of the invention encompass a wind turbine having a tower; a nacelle mounted atop the tower, the nacelle having a cover and a bedplate; a rotor, the rotor having a rotatable hub and at least one rotor blade; and a system for reducing vibration in the wind turbine. It should also be understood that the wind turbine may be configured with any one of the embodiments set forth above for reducing vibrations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
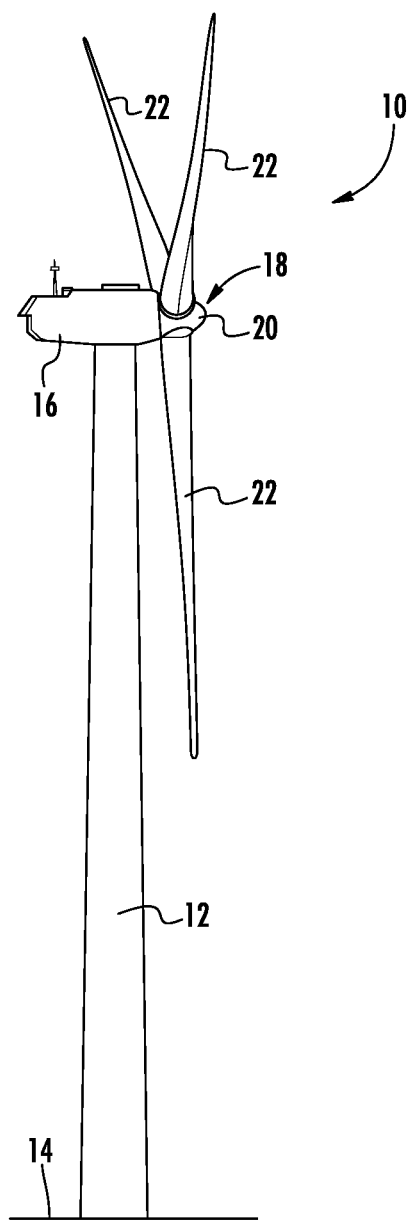
FIG. 1 illustrates a perspective view of one embodiment of a wind turbine according to the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents.

The present invention discloses a system for reducing vibration in a wind turbine. Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
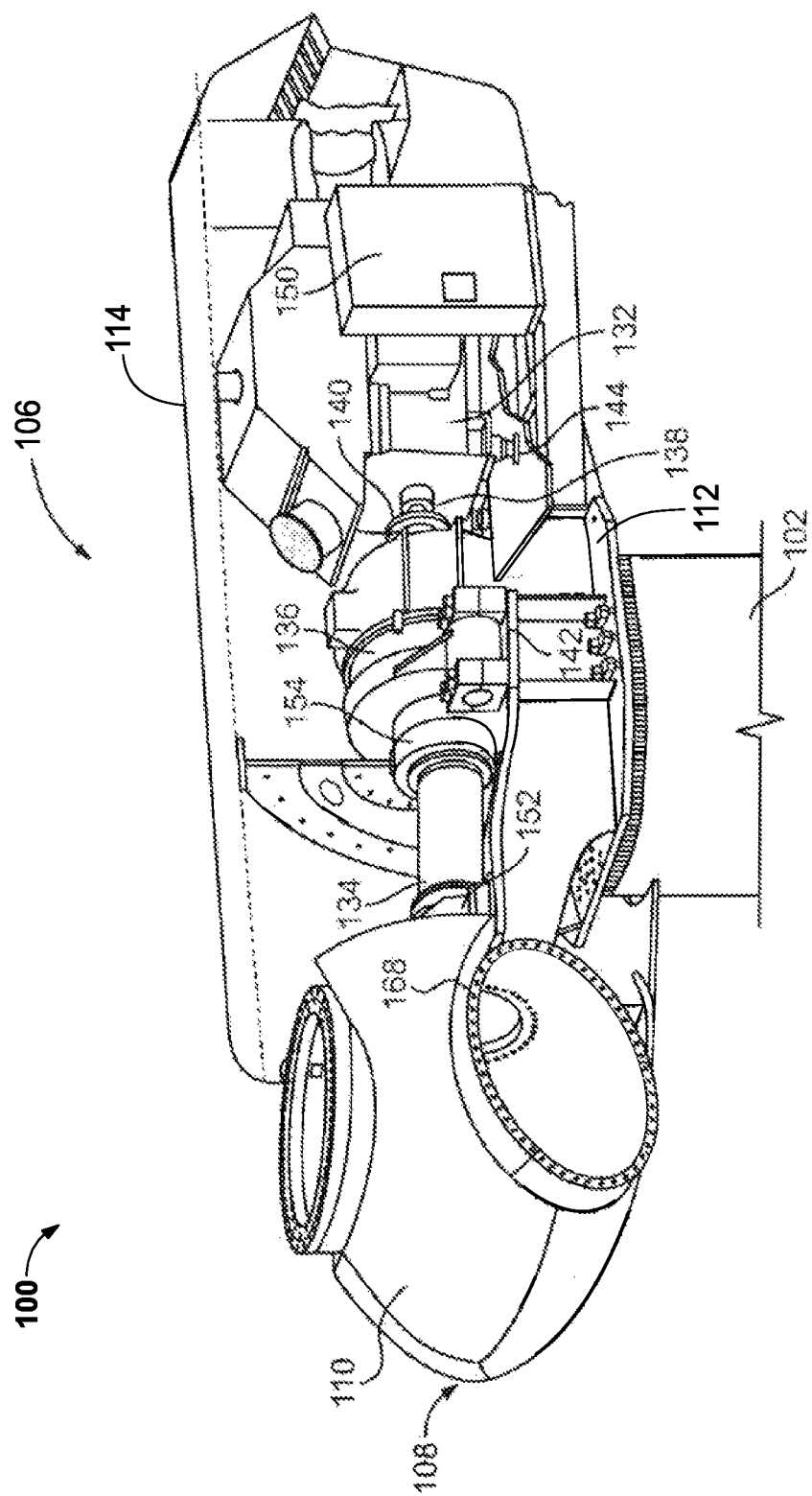
FIG. 2 illustrates a schematic view of one embodiment of a nacelle of a wind turbine according to the present disclosure.

Referring now to FIG. 2, a schematic view of a nacelle 106 configured atop a tower 102 of exemplary wind turbine 100 is illustrated. The nacelle 106 includes a bedplate 112 and a cover 114. The rotor 108 may be coupled to the nacelle 106 and includes hub 110 and pitch bearings 168. The pitch bearings 168 are coupled between the hub 110 and a respective rotor blade 22 (FIG. 1). Further, rotor 108 may be rotatably coupled to an electric generator 132 positioned within nacelle 106 by rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 with coupling 140, and rotation of high speed shaft 138 facilitates production of electrical power by generator 132. Gearbox 136 and generator 132 are supported by supports 142 and 144, respectively. The nacelle 106 may also include a control system 150 configured to control various wind turbine components. Further, the nacelle 106 may also include main, or forward and aft, support bearings 152 and 154, respectively.

Figure 3:
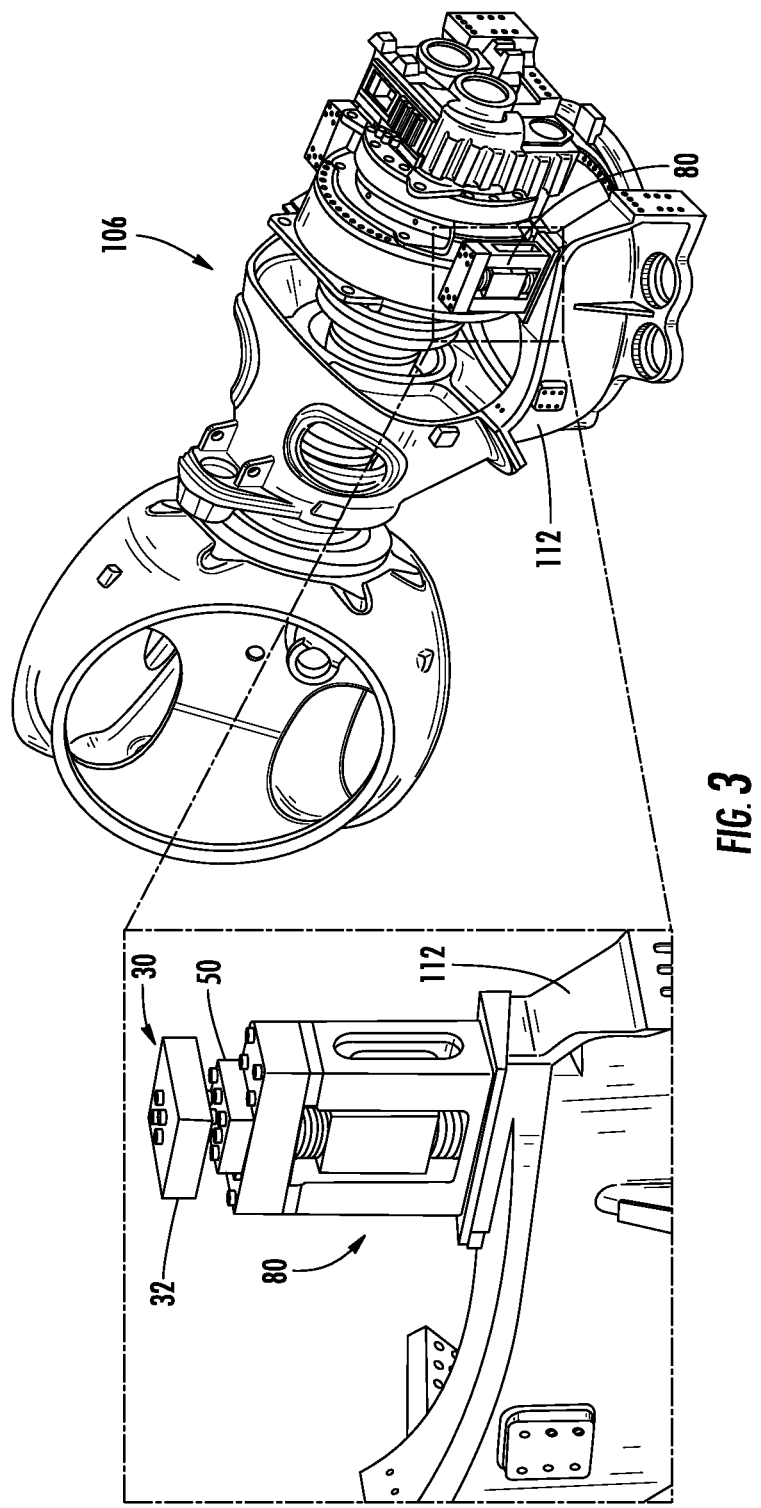
FIG. 3 illustrates a schematic view of another embodiment of a nacelle of a wind turbine according to the present disclosure.

Operation of various wind turbine components described herein may contribute to vibrations within the wind turbine causing disturbing neighboring noise. As such, a system for reducing vibration may be installed on any suitable component for reducing such vibrations. For example, in one embodiment, the system is located on the bedplate 112 due to bedplate vibration potentially exciting structural components (including, for example, one or more rotor blades, the tower, or the nacelle). Such bedplate vibration may cause more disturbing noise to neighboring areas than other wind turbine components, such as the gearbox 136. More specifically, the system 30 may be located on top of the isolation mount 80 within the inner sidewall of the bedplate 112, as illustrated in FIG. 3. For various wind turbine models, the bedplate sidewall may experience strong vibrations due to laterally low stiffness of the bedplate 112. The isolation mount 80 is located relatively close to the sidewall of the bedplate 112. As such, locating the system 30 on top of the isolation mount 80 provides enhanced vibration reduction. Further, such a location provides easier installation and maintenance. The system 30 disclosed herein is not limited to being located on the bedplate 112, or the isolation mount top, however, and may be easily located where vibration reduction is necessary.

Figure 4:
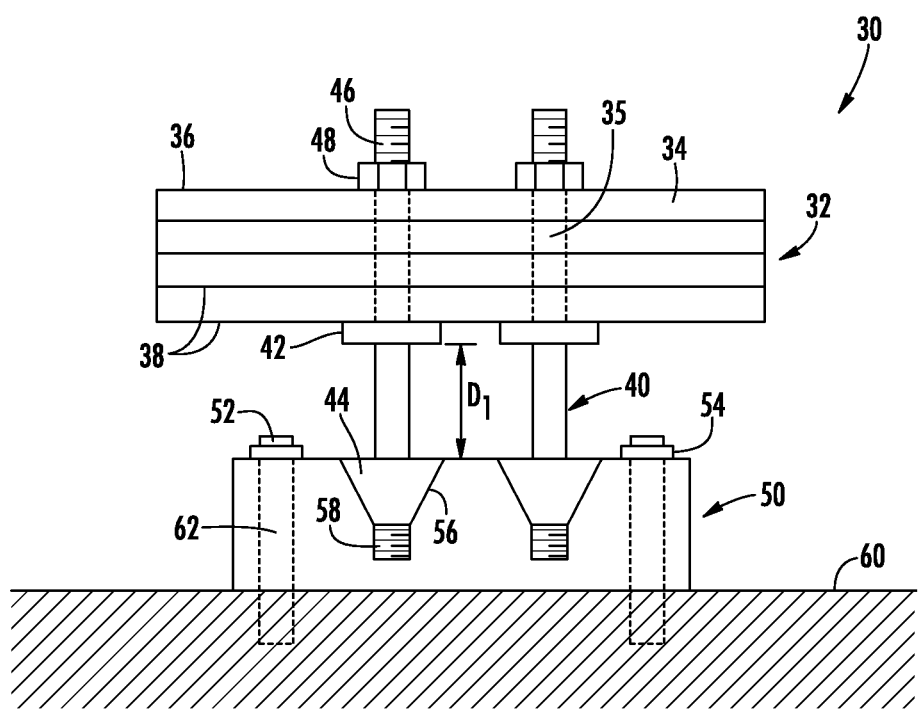
FIG. 4 illustrates a side view of one embodiment of a system for reducing vibration in a wind turbine according to the present disclosure.
Figure 5:
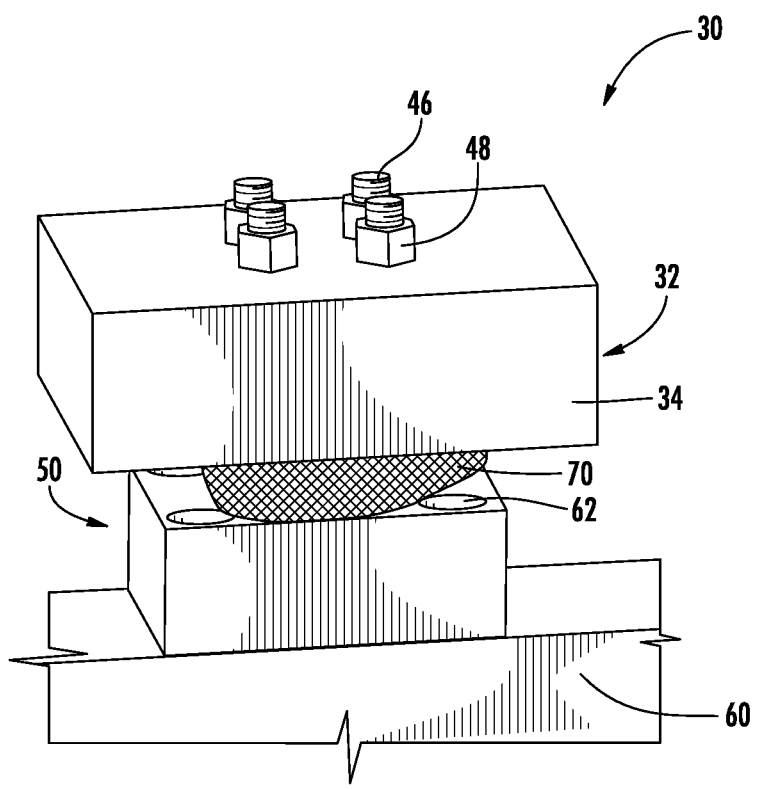
FIG. 5 illustrates a perspective view of another embodiment of a system for reducing vibration in a wind turbine according to the present disclosure.

Referring now to FIGS. 4 and 5, one embodiment of a system 30 for reducing vibration in a wind turbine is illustrated. FIG. 4 illustrates a side view of one embodiment of the system 30; whereas FIG. 5 illustrates a three-dimensional view of a similar embodiment of the system 30 according to the present disclosure.

As shown in FIG. 4, the system 30 includes a mass structure 32, at least one rod 40 having an upper level stop 42 and a lower level stop 44, and a base 50. The mass structure 32 has at least one hole 35 extending therethrough. In the depicted embodiment, the holes extend from a top mass surface 36 to a bottom mass surface 38. Further, the mass structure 32 may consist of one mass structure plate or other unitary structure 34 or a plurality of members, such as mass structure plates 34 having varying thicknesses. For example, as illustrated in FIG. 4, the mass structure 32 consists of four mass structure plates 34 (multiple mass structures may be desired to enable manual lifting of the structures), whereas FIG. 5 illustrates a system 30 having only one mass structure plate 34. In additional embodiments, the mass structure 32 may consist of more than four plates or less than four plates. Further, the mass structure 32 has a designed weight, shape, and fixed axial distance $D_1$ between the upper level stop 42 and the lower level stop 44 to give the system 30 a specifically tuned natural frequency. For example, in the exemplary embodiment, the mass structure 32 has a generally square shape, which provides symmetric modes in two directions parallel to the square edge.

Still referring to FIG. 4, the rod 40 may also have a top threaded portion 46, an upper level stop 42 disposed on (within the threaded region) or below the top threaded portion 46, and a fixed lower level stop 44 disposed below the upper level stop 42. For example, as illustrated, the upper level stop 42 is disposed below the top threaded portion 46 of the rod 40. Further, the upper level stop 42 may be axially locked relative to the rod 40 so as to maintain the fixed axial distance $D_1$.

In the preferred embodiment, the top threaded portion 46 of each rod 40 extends through the hole 35 in the mass structure 32, with the mass structure 32 resting on the upper level stop 42. A nut 48 may be inserted onto the top threaded portion 46 above the mass structure 32 so as to secure the mass structure 32. Additionally, the system 30 may include a plurality of rods 40 symmetrically disposed relative to the mass structure 32 and the base 50. For example, as illustrated in FIGS. 4 and 5, four rods are symmetrically disposed relative to the mass structure 32 and the base 50. Additionally, the four rods 40 are symmetrically spaced relative to the square mass structure 32. Such a design provides independent but symmetric modes so the vibration energy may be absorbed more effectively. A single rod may be used, but to obtain a symmetric mode at, for example, 320 Hz with a single rod would require a relatively large rod diameter with a relatively small mass, which may not be feasible in certain configurations.

Still referring to FIG. 4, the base 50 may have at least one aperture 56 designed for receipt of the lower level stop 44 therein. In the illustrated embodiment, the lower level stop 44 may be secured within the aperture 56 by a bottom threaded portion 58 of the rod 40. Further, the base 50 may be configured for attachment to a component 60 of the wind turbine, for example to a bedplate of a wind turbine. Such a configuration may reduce the vibrations of the wind turbine more effectively than locating the system on other wind turbine components, such as a gearbox. Further, the system 30 may be attached to wind turbine component 60 using base bolts 52. The base bolts 52 fit within a plurality of base holes 62 located in the base 50. The base bolts 52 are secured within the base holes 62 by base nuts 54. The base holes 62 may be configured such that the base bolts 52 and nuts 54 sit atop the base 50 (FIG. 4) or the base holes may be configured such that the base bolts 52 and nuts 54 are recessed within the base holes 62 (FIG. 5). It should also be understood that the method of attaching the base 50 to the component 60 is not limited to using bolts and nuts, but may be any suitable method in the art.

Referring now to FIG. 5, the system 30 may also include a dampening element, such as a wire mesh 70, between the upper level stop 42 and the lower level stop 44 so as to provide damping to the system 30. Further, the wire mesh 70 may be donut-shaped to dissipate vibration energy from the system 30 if vibrations become too intense and damage the base 50.

Figure 6:
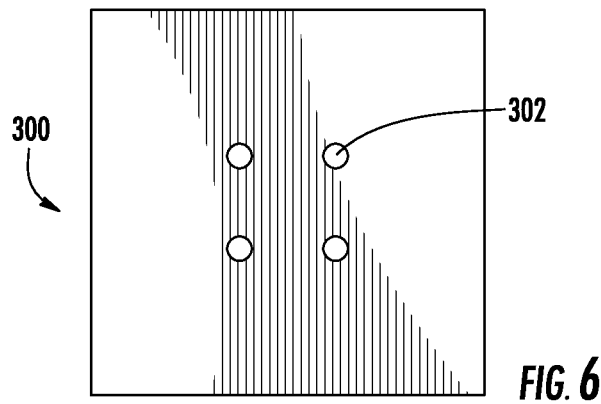
FIG. 6 illustrates a top view of one embodiment of a mass structure for the system according to the present disclosure.
Figure 7:
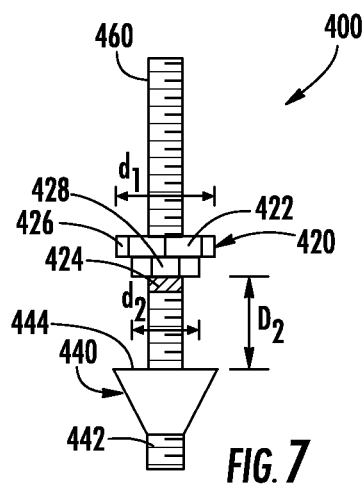
FIG. 7 illustrates a side view of one embodiment of a rod for the system according to the present disclosure.
Figure 8:
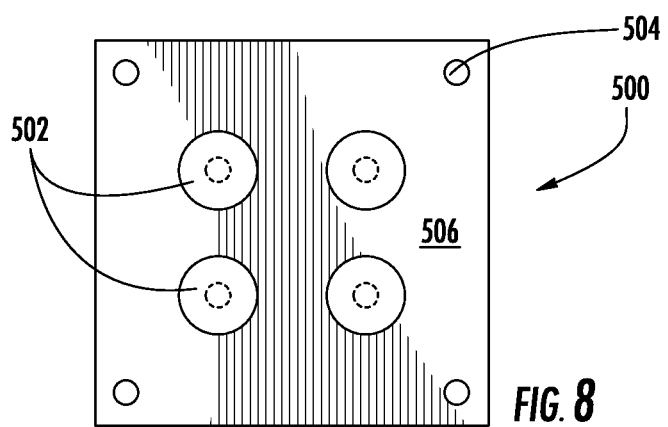
FIG. 8 illustrates a top view of one embodiment of a base for the system according to the present disclosure.

Referring now to FIGS. 6-8, various embodiments of the individual components of the system 30 are illustrated. As shown in FIG. 6, the mass structure 300 has a generally square shape with four holes 302 symmetrically spaced. FIG. 7 illustrates an embodiment of the rod 400 having a top threaded portion 460, a bottom threaded portion 442, an upper level stop 420 disposed on the top threaded portion 460, and a fixed lower level stop 440 disposed below the upper level stop 420. In this embodiment, the upper level stop 420 includes a sleeve nut 422 disposed on the top threaded portion 460 of the rod 400. The sleeve nut 422 may be flexible along the top threaded portion 460 so as to provide easy initial tuning and tuning maintenance as well as fine-tuning capabilities.

After proper tuning, the sleeve nut 422 may be axially locked on the top threaded portion 460 so as not to move axially on the top threaded portion 460 of the rod 400 after the sleeve nut 422 is positioned. Further, a locking mechanism 424 may be employed after the sleeve nut 422 is positioned so as to provide further locking protection of the sleeve nut 422 thereby avoiding detuning issues. As such, the fixed axial distance $D_2$ between the sleeve nut 422 and the lower level stop 440 gives the system a specifically tuned natural frequency, which reduces vibrations in the wind turbine. The locking mechanism 424 may be a self-locking nut, a locking wire, or any suitable locking mechanism in the art.

Further, the sleeve nut 422 may include an upper portion 426 and a lower portion 428, wherein the upper portion 426 has a flat top surface and a first diameter, $d_1$, and the lower portion 428 has a second diameter, $d_2$. In a particular embodiment, the first diameter $d_1$ is greater than the second diameter $d_2$. As such, the lower portion may be appropriate for torqueing or adjusting the sleeve nut.

Still referring to FIG. 7, the lower level stop 440 may have a tapered conical configuration. The conical shape of the lower level stop 440 allows for better contact between the base 500 and the rods 400, thereby providing robust supporting boundary conditions between the lower level stop 440 and the base 500 so to provide proper natural frequencies and vibration modes for the system. Accordingly, the base 500 may have one or more corresponding conical apertures 502 for receipt of the conical-shaped lower level stops 440. For example, as illustrated in FIG. 8, the base 500 has four conical-shaped apertures 502 symmetrically spaced. As such, a top surface 444 of the conical-shaped lower level stop 440 may be flush with a top surface 506 of the base 500 when the conical-shaped lower level stops 440 are received within the apertures 502. Additionally, and as mentioned, the base 500 may also include a plurality of base holes 504, wherein a plurality of base bolts (not shown) may be used to attach the system to a wind turbine component, such as a bedplate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for reducing vibration in a wind turbine, the system comprising:
    a mass structure defined by one or a plurality of members and having at least one hole extending therethrough;
    a rod having a top threaded portion, an upper level stop disposed on or below the top threaded portion, and a fixed lower level stop disposed at a predetermined axial distance below the upper level stop;
    the top threaded portion extending through the hole in the mass structure such that the mass structure is supported directly against the upper level stop so that the mass structure is positionally located on the rod between the top threaded portion and the upper level stop;

a base, the base having an aperture, wherein the lower level stop is rigidly seated in the aperture, the base configured for being fixedly attached to a component of the wind turbine; and wherein the mass structure has a predetermined weight and shape that, in combination with the predetermined axial distance between the upper level stop and the lower level stop, produces a specifically tuned natural frequency when the base is fixedly attached to the wind turbine component and vibrations are exhibited at the wind turbine component during operation of the wind turbine.

2. The system as in claim 1, further comprising a plurality of the rods with respective upper level and fixed lower level stops symmetrically disposed relative to the mass structure and the base.

3. The system as in claim 2, wherein the mass structure has a generally square shape, and further comprising four of the rods symmetrically spaced relative to the square mass structure.

4. The system as in claim 1, further comprising a dampening element between the upper level stop and the lower level stop so as to provide damping to the system.

5. The system as in claim 1, wherein the upper level stop comprises a sleeve nut disposed on the top threaded portion of the rod so as not to move axially on the top threaded portion of the rod after positioning of the sleeve nut on the top threaded portion of the rod.

6. The system as in claim 5, wherein the sleeve nut is locked in position on the top threaded portion after positioning.

7. The system as in claim 5, wherein the sleeve nut comprises an upper portion and a lower portion, wherein the upper portion has a flat top surface and a first diameter, wherein the lower portion has a second diameter, and wherein the first diameter is greater than the second diameter.

8. The system as in claim 1, wherein the base is configured for being fixedly attached to an isolation mount located on a bedplate of the wind turbine.

9. A system for reducing vibration in a wind turbine, the system comprising:
a mass structure defined by one or a plurality of members and having at least one hole extending therethrough;
a rod having a top threaded portion, an upper level stop disposed on or below the top threaded portion, and a fixed lower level stop disposed at a predetermined axial distance below the upper level stop;
the top threaded portion extending through the hole in the mass structure such that the mass structure is supported directly against the upper level stop so that the mass structure is positionally located on the rod between the top threaded portion and the upper level stop;
a base, the base having an aperture, wherein the lower level stop is rigidly seated in the aperture, the base configured for attachment to a component of the wind turbine; and
wherein the mass structure has a predetermined weight and shape that, in combination with the predetermined axial distance between the upper level stop and the lower level stop, produces a specifically tuned natural frequency when the base is attached to the wind turbine component and vibrations are exhibited at the wind turbine component during operation of the wind turbine, and
wherein the lower level stop has a tapered conical configuration and the aperture in the base has a corresponding conical such that a top surface of the lower level stop is flush with a top surface of the base.

10. The system as in claim 9, Wherein the lower level stop further comprises a bottom threaded portion, wherein the bottom threaded portion secures the rod within the aperture in the base.

11. A wind turbine, comprising:
a tower;
a nacelle mounted atop the tower, the nacelle having a cover and a bedplate;
a rotor, the rotor having a rotatable hub and at least one rotor blade; and
a system for reducing vibration in the wind turbine, the system comprising:
a mass structure defined by one or a plurality of members and having at least one hole extending therethrough;
a rod having a top threaded portion, an upper level stop disposed on or below the top threaded portion, and a fixed lower level stop disposed at a predetermined axial distance below the upper level stop;
the top threaded portion extending through the hole in the mass structure such that the mass structure is supported directly against the upper level stop so that the mass structure is positionally located on the rod between the top threaded portion and the upper level stop;
a base, the base having an aperture, wherein the lower level stop is rigidly seated in the aperture, the base configured for being fixedly attached to a component of the wind turbine; and
wherein the mass structure has a predetermined weight and shape that, in combination with the predetermined axial distance between the upper level stop and the lower level stop, produces a specifically tuned natural frequency when the base is fixedly attached to the wind turbine component and vibrations are exhibited at the wind turbine component during operation of the wind turbine.

12. The wind turbine as in claim 11, further comprising a plurality of the rods symmetrically disposed relative to the mass structure and the base.

13. The wind turbine as in claim 12, wherein the mass structure has a generally square shape, and further comprising four of the rods symmetrically spaced relative to the square mass.

14. The wind turbine as in claim 11, further comprising a dampening element between the upper level stop and the lower level stop so as to provide damping to the system.

15. The wind turbine as in claim 11, wherein the upper level stop comprises a sleeve nut disposed on and axially locked on the top threaded portion of the rod so as not to move axially on the threaded portion of the rod after positioning of the nut on the top threaded portion of the rod.

16. The wind turbine as in claim 15, wherein the sleeve nut comprises an upper portion and a lower portion, wherein the upper portion has a flat top surface and a first diameter, wherein the lower portion has a second diameter, and wherein the first diameter is greater than the second diameter.

17. A wind turbine, comprising:
a tower;
a nacelle mounted atop the tower, the nacelle having a cover and a bedplate;
a rotor, the rotor having a rotatable hub and at least one rotor blade; and a system for reducing vibration in the wind turbine, the system comprising:

a mass structure defined by one or a plurality of members and having at least one hole extending therethrough;

a rod having a top threaded portion, an upper level stop disposed on or below the top threaded portion, and a fixed lower level stop disposed at a predetermined axial distance below the upper level stop;

the top threaded portion extending through the hole in the mass structure such that the mass structure is supported directly against the upper level stop so that the mass structure is positionally located on the rod between the top threaded portion and the upper level stop;

a base, the base having an aperture, wherein the lower level stop is rigidly seated in the aperture, the base configured for attachment to a component of the wind turbine; and wherein the mass structure has a predetermined weight and shape that, in combination with the predetermined axial distance between the upper level stop and the lower level stop, produces a specifically tuned natural frequency when the base is attached to the wind turbine component and vibrations are exhibited at the wind turbine component during operation of the wind turbine, and wherein the lower level stop has a tapered conical configuration and the aperture in the base has a corresponding conical recess for receipt of the lower level stop such that a top surface of the lower level stop is flush with a top surface of the base.

18. The wind turbine as in claim 17, wherein the lower level stop further comprises a bottom threaded portion, wherein the bottom threaded portion secures the rod within the aperture in the base.

* * * * *